United States Patent
Hagihara

(10) Patent No.: US 11,611,858 B2
(45) Date of Patent: Mar. 21, 2023

(54) COMMUNICATION CONTROL DEVICE, COMMUNICATION CONTROL METHOD, AND STORAGE MEDIUM

(71) Applicant: HONDA MOTOR CO., LTD., Tokyo (JP)

(72) Inventor: Tomoaki Hagihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 16/997,966

(22) Filed: Aug. 20, 2020

(65) Prior Publication Data

US 2021/0067928 A1    Mar. 4, 2021

(30) Foreign Application Priority Data

Aug. 27, 2019    (JP) .............................. JP2019-154812

(51) Int. Cl.
*H04W 4/46* (2018.01)
*H04W 84/18* (2009.01)

(52) U.S. Cl.
CPC .............. *H04W 4/46* (2018.02); *H04W 84/18* (2013.01)

(58) Field of Classification Search
CPC ......... H04W 4/40; H04W 4/46; H04W 76/14; H04W 4/44; H04W 92/18; H04W 4/80; H04W 72/02; H04W 4/029; H04W 4/023
See application file for complete search history.

(56) References Cited

U.S. PATENT DOCUMENTS 10,089,876 B1 * 10/2018 Ramasamy .......... G05D 1/0231

FOREIGN PATENT DOCUMENTS

| JP | 2001-358640 | 12/2001 | |
|---|---|---|---|
| JP | 2005-033397 | 2/2005 | |
| JP | 2010-287246 | 12/2010 | |
| JP | 2013-005186 | 1/2013 | |
| WO | WO-2013074868 A1 * | 5/2013 | ............. B60K 35/00 |
| WO | WO-2014011552 A1 * | 1/2014 | ............... B60Q 1/00 |

OTHER PUBLICATIONS

Japanese Office Action for Japanese Patent Application No. 2019-154812 dated Mar. 15, 2022.

* cited by examiner

*Primary Examiner* — Khalid W Shaheed
(74) *Attorney, Agent, or Firm* — Amin, Turocy & Watson, LLP

(57) ABSTRACT

A communication control device includes a reception unit configured to receive information transmitted in an ad hoc mode from a first vehicle, from a second vehicle through a cellular line, a specifying unit configured to specify a transmission area in which communication with the first vehicle in the ad hoc mode is possible on the basis of position information of the first vehicle included in the information, and a transmission unit configured to transmit a response to the information including an instruction to perform ad hoc communication with the first vehicle, to a third vehicle located in the vicinity of the transmission area through the cellular line.

6 Claims, 7 Drawing Sheets

FIG. 2

| ITEM NAME | DESCRIPTION |
|---|---|
| REGION IDENTIFICATION CODE | IDENTIFIER FOR UNIQUELY IDENTIFYING REGION |
| LATITUDE | LATITUDE OF REPRESENTATIVE POINT OF REGION IDENTIFICATION CODE |
| LONGITUDE | LONGITUDE OF REPRESENTATIVE POINT OF REGION IDENTIFICATION CODE |
| ESTIMATION SCHEME | (DESTINATION, DRIVING HISTORY, POSITION INFORMATION) |
| CERTAINTY FACTOR | DEGREE OF LIKELIHOOD OF VEHICLE MOVING TO POSITION IN FUTURE |

FIG. 5

| FIRST VEHICLE | SECOND VEHICLE | THIRD VEHICLE |
|---|---|---|
| REQUEST INFORMATION OF FIRST VEHICLE (REQUEST, IDENTIFICATION INFORMATION OF FIRST VEHICLE, POSITION INFORMATION, CURRENT TIME INFORMATION, FUTURE POSITION INFORMATION) | REQUEST INFORMATION OF FIRST VEHICLE (REQUEST, IDENTIFICATION INFORMATION OF FIRST VEHICLE, POSITION INFORMATION, CURRENT TIME INFORMATION, FUTURE POSITION INFORMATION) | REQUEST INFORMATION OF FIRST VEHICLE (REQUEST, IDENTIFICATION INFORMATION OF FIRST VEHICLE, POSITION INFORMATION, CURRENT TIME INFORMATION, FUTURE POSITION INFORMATION) |
| — | IDENTIFICATION INFORMATION OF SECOND VEHICLE, FUTURE POSITION INFORMATION OF SECOND VEHICLE | IDENTIFICATION INFORMATION OF SECOND VEHICLE, FUTURE POSITION INFORMATION OF SECOND VEHICLE |
| — | — | IDENTIFICATION INFORMATION OF THIRD VEHICLE, FUTURE POSITION INFORMATION OF THIRD VEHICLE |
| ⋮ | ⋮ | ⋮ |

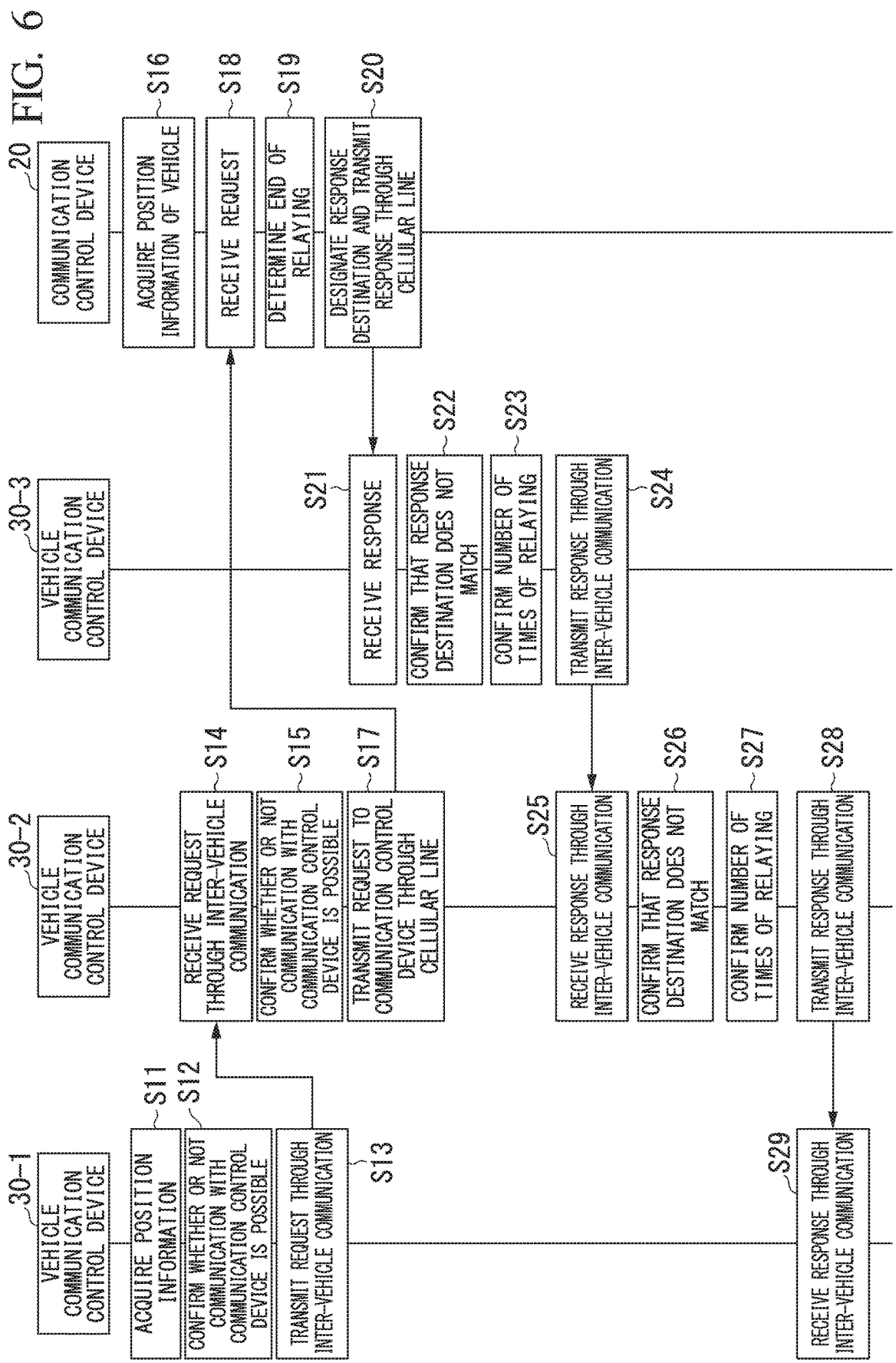

COMMUNICATION CONTROL DEVICE, COMMUNICATION CONTROL METHOD, AND STORAGE MEDIUM

CROSS-REFERENCE TO RELATED APPLICATION

Priority is claimed on Japanese Patent Application No. 2019-154812, filed Aug. 27, 2019, the content of which is incorporated herein by reference.

BACKGROUND OF THE INVENTION

Field of the Invention

The present invention relates to a communication control device, a communication control method, and a storage medium.

Description of Related Art

Inter-vehicle communication between vehicles using an ad hoc wireless network, which is an autonomous wireless network temporarily constructed by mobile bodies, has been examined. In such inter-vehicle communication, when the mobile bodies cannot directly communicate with each other, information is exchanged by relaying in wireless terminals present midway therebetween. In the case of relaying, a vehicle determines a vehicle that relays data on the basis of positions of a transmitting vehicle and a receiving vehicle (see, for example, Japanese Unexamined Patent Application, First Publication Nos. 2010-287246 and 2013-5186).

SUMMARY OF THE INVENTION

A mobile body may attempt to perform cellular communication with a communication partner such as a server, but in some areas, the mobile body may be offline and unable to perform cellular communication in an area in which communication is restricted such as in a tunnel or the like. When data is relayed, it is necessary to request nearby terminals to relay information in order to deliver the information to a distant terminal using an ad hoc network, and thus, adjacent terminals repeat relaying, which causes a problem in that an amount of communication traffic increases.

An aspect according to the present invention has been made in consideration of such circumstances, and an object thereof is to provide a communication control device, a communication control method, and a storage medium capable of enabling communication with a communication partner even when a mobile body is located in an area in which cellular communication is not possible, and enabling reduction in an amount of communication traffic.

The present invention adopts the following aspects in order to solve the above problems and achieve the object.

(1) A communication control device according to an aspect of the present invention includes a reception unit configured to receive information transmitted in an ad hoc mode from a first vehicle, from a second vehicle through a cellular line; a specifying unit configured to specify a transmission area in which communication with the first vehicle in the ad hoc mode is possible on the basis of position information of the first vehicle included in the information; and a transmission unit configured to transmit a response to the information including an instruction to perform ad hoc communication with the first vehicle, to a third vehicle located in the vicinity of the transmission area through the cellular line.

(2) In the aspect (1), the specifying unit may transmit, to the third vehicle, the response including an instruction to perform ad hoc communication with a fourth vehicle located in the transmission area when the third vehicle is not located in the transmission area.

(3) In the aspect (1) or (2), the information may further include a request to the communication control device, future position information of the first vehicle, a current time, and identification information for identifying the first vehicle.

(4) A communication control method according to another aspect of the present invention includes: receiving, by a computer, information transmitted in an ad hoc mode from a first vehicle, from a second vehicle through a cellular line; specifying, by the computer, a transmission area in which communication with the first vehicle in the ad hoc mode is possible on the basis of position information of the first vehicle included in the information; and transmitting, by the computer, a response to the information including an instruction to perform ad hoc communication with the first vehicle, to a third vehicle located in the vicinity of the transmission area through the cellular line.

(5) A computer-readable non-temporary storage medium according to another aspect of the present invention stores a program causing a computer to: receive information transmitted in an ad hoc mode from a first vehicle, from a second vehicle through a cellular line; specify a transmission area in which communication with the first vehicle in the ad hoc mode is possible on the basis of position information of the first vehicle included in the information; and transmit a response to the information including an instruction to perform ad hoc communication with the first vehicle, to a third vehicle located in the vicinity of the transmission area through the cellular line.

According to the aspects (1) to (5), the second vehicle that has received the information transmitted in the ad hoc mode transmits the information to the communication control device using the cellular line, which enables communication with a communication partner even when a mobile body is located in an area in which cellular communication is not possible.

According to the aspects (1) to (5), since the second vehicle that receives the information transmitted in the ad hoc mode transmits the information to the communication control device using the cellular line, it is possible to reduce the number of information relays, and thus, to perform reduction in an amount of communication traffic.

According to the aspects (1) to (5), since only the third vehicle in the vicinity (including a transmission area) of a transmission area in which communication with the first vehicle that has transmitted the information is possible is permitted to relay in ad hoc communication (since a vehicle that is a starting point of ad hoc relay is limited to the vicinity of a target vehicle), the number of times of relaying can be reduced, and thus, it is possible to perform reduction in an amount of communication traffic.

According to the aspect (2), by the selected third vehicle transmitting the received response to the fourth vehicle in the ad hoc mode, it is possible for the fourth vehicle to relay the response in the ad hoc mode and transmit the response to the first vehicle. Thereby, even when the mobile body is located in an area in which cellular communication is not possible, it is possible to receive a response from the communication partner.

According to the aspect (3), by specifying the transmission area in which communication with the first vehicle is possible, it is possible to select the third vehicle located in the vicinity of the specified transmission area. Thereby, it is possible to reduce the number of times the response is relayed.

BRIEF DESCRIPTION OF THE DRAWINGS

FIG. 2 is a diagram illustrating an example of a configuration of future position information according to the embodiment.

FIG. 5 is a diagram illustrating an example of transmission information transmitted by the vehicle communication control device according to the embodiment.

FIG. 6 is a flowchart of an example of a process of transmitting request information and receiving response information according to the embodiment.

DETAILED DESCRIPTION OF THE INVENTION

Embodiments of a communication control device, a communication control method, and a storage medium of the present invention will be described below with reference to the drawings. In the following description, a vehicle may be a vehicle that uses gasoline or the like as a fuel, or an electric vehicle equipped with a secondary battery.

[Overview of System]

Figure 1:
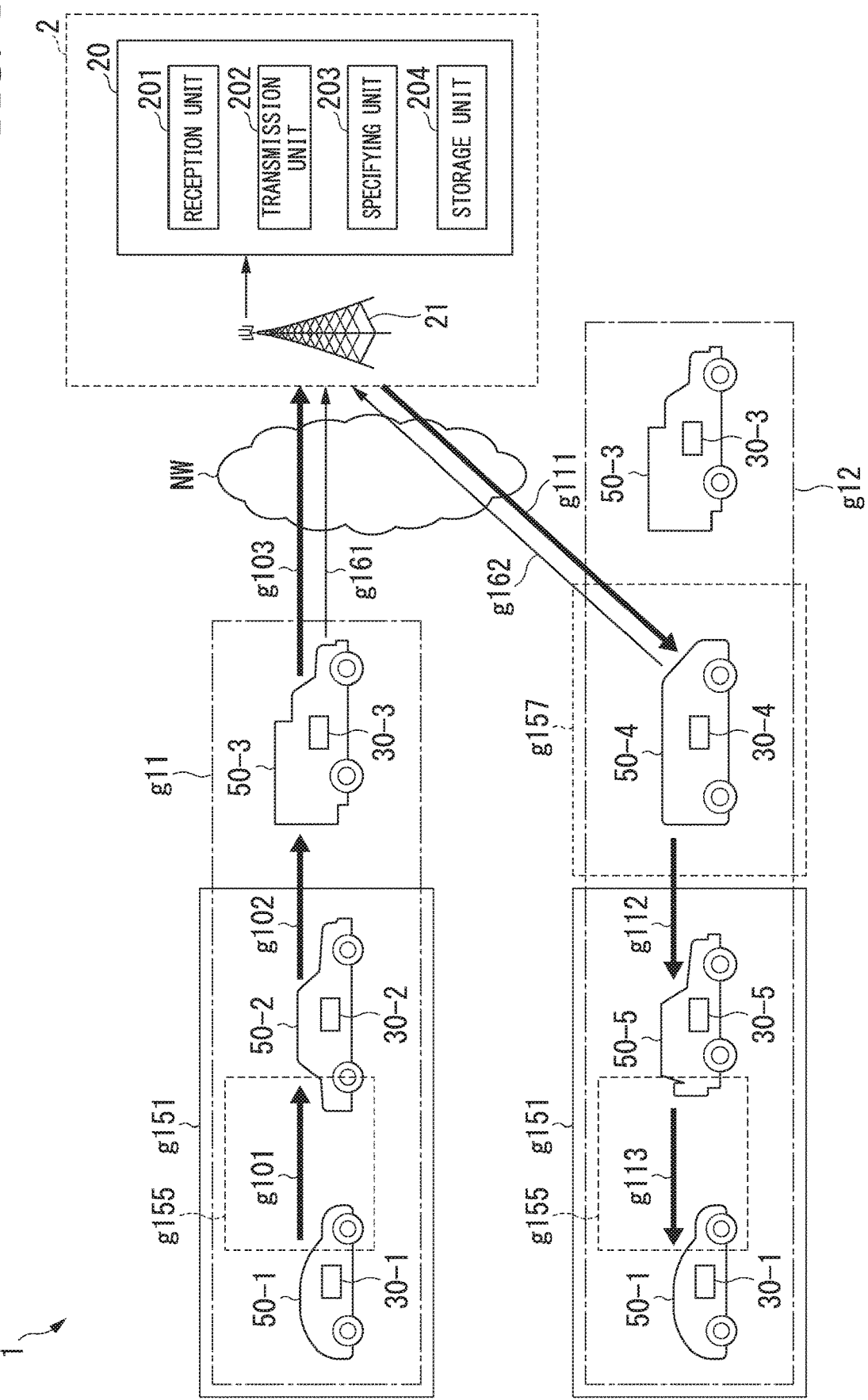
FIG. 1 is a diagram illustrating an example of a configuration and an example of an operation of an information relay system including a communication control device according to an embodiment.

First, an overview of the system will be described. FIG. 1 is a diagram illustrating an example of a configuration and an example of an operation of an information relay system 1 including a communication control device 20 according to the embodiment. As illustrated in FIG. 1, the information relay system 1 includes a communication control device system 2, vehicles 50 (50-1, 50-2, ..., 50-5), and a network NW. In the following description, when one of the vehicles 50-1, 50-2, ..., is not specified, the vehicles 50-1, 50-2, ... are referred to as a vehicle 50. A vehicle communication control device 30 (30-1, 30-2, ..., 30-5) is mounted in the vehicle 50. In the following description, when one of the vehicle communication control devices 30-1, 30-2, ... is not specified, the vehicle communication control devices 30-1, 30-2, ... are referred to as a vehicle communication control device 30.

The communication control device system 2 receives request information that the vehicle communication control device 30-3 has transmitted via the network NW. The communication control device system 2 includes, for example, a base station 21 and a communication control device 20. The communication control device 20 includes a reception unit 201, a transmission unit 202, a specifying unit 203, and a storage unit 204.

In FIG. 1, a transmission path in an area indicated by reference sign g11 indicates a transmission order of request information when the vehicle communication control device 30-1 mounted in the first vehicle 50-1 transmits a request to the communication control device 20 in time t1. A transmission path in an area indicated by reference sign g12 indicates a transmission order of response information when the communication control device 20 transmits a response to the request to the vehicle communication control device 30-1 mounted in the first vehicle 50-1 in time t2 after time t1.

In FIG. 1, an area indicated by reference sign g151 indicates a range in which communication on a cellular line via the base station 21 is not possible. For example, the area is an area in which radio waves on the cellular line passing through the base station 21 such as in a tunnel do not reach or are weak. Reference sign g155 indicates a transmission area in which communication is possible in inter-vehicle communication. In the embodiment, it is assumed that the vicinity of the transmission area (reference sign g157) in which communication is possible also includes a transmission area in which communication is possible. For example, when the vehicle 50-1 is traveling near an exit of the tunnel like the vehicle 50-5 at the time of reception, the vehicle 50-1 is located in an area in which communication using a cellular line is not possible, but the vicinity of a transmission area in which communication with the vehicle 50-3 that can perform communication using the cellular line is possible includes the transmission area in which communication is possible.

When the vehicle communication control device 30-1 mounted in the first vehicle 50-1 desires to transmit the request information to the communication control device 20, the vehicle communication control device 30-1 cannot transmit the request information to the communication control device 20 using the cellular line in the tunnel. Therefore, the vehicle communication control device 30-1 transmits request information including the request information directed to the communication control device 20 through inter-vehicle communication, as indicated by reference sign g101. The vehicle communication control device 30-1 transmits the request information in the ad hoc mode without designating a transmission destination.

A vehicle communication control device 30-2 mounted in a second vehicle 50-2 that is traveling in a transmission area in which inter-vehicle communication with the vehicle communication control device 30-1 is possible receives the request information that the vehicle communication control device 30-1 transmits. Since the vehicle communication control device 30-2 that has received the request information cannot transmit the request information to the communication control device 20 using the cellular line in the tunnel, the vehicle communication control device 30-2 transmits the request information received through the inter-vehicle communication, as indicated by reference sign g102. Thus, the request information transmitted by the vehicle communication control device 30-1 is caused to be received by the vehicle communication control device 30 mounted in the vehicle 50 traveling in the transmission area in which communication with the vehicle communication control device 30-1 is possible.

The vehicle communication control device 30-3 mounted in the third vehicle 50-3 traveling in the transmission area in which inter-vehicle communication with the vehicle communication control device 30-2 is possible receives the request information transmitted by the vehicle communication control device 30-2. Since the vehicle communicacontrol device 30-3 that has received the request information can transmit the request information to the communication control device 20 using the cellular line, the vehicle communication control device 30-3 transmits the request information received via the network NW, as indicated by reference sign g103.

Further, the vehicle communication control device 30, for example, transmits position information indicating a current position of the vehicle 50 in which the vehicle communication control device 30 is mounted, to the communication control device 20 via a roadside device (not illustrated) installed on a roadside and the network NW (reference signs g161 and g162). Examples of the network NW include the Internet, a wide area network (WAN), a local area network (LAN), a provider device, and a wireless base station. The vehicle communication control device 30, for example, acquires current position information on the basis of information received from a global positioning system (GPS). The vehicle communication control device 30 may acquire information indicating a current position from the roadside device when the position information can be acquired from the roadside device.

The vehicle communication control device 30 transmits, to the communication control device 20, future position information that is a result of estimating a position at which the vehicle will move in the future, in addition to the current position. The future position information includes one or more region identification codes for uniquely identify the position, and a certainty factor of being expected to move to the area in the future is associated with each region identification code. A detailed configuration of the future position information and an estimation scheme will be described below.

When the communication control device 20 transmits the response information to the received request information, the communication control device 20 selects an area in which a relay instruction for the response information is performed, on the basis of information (the position information and the future position information) included in the received request information and information received from the vehicle communication control device 30. The communication control device 20 may limit the area in which the relay instruction is performed when there is concern that a communication quality problem is caused by an increase in traffic and when relative positions of the first, second, and third vehicles used for relaying of the request information are expected not to change. The communication control device 20 transmits response information including information indicating a response to the received request information to a vehicle communication control device 30 mounted in a fourth vehicle 50-4 using the cellular line, as indicated by reference sign g111. The response includes, for example, identification information of the vehicle communication control device 30-1 that is a transmission destination, and the area in which a relay instruction is performed.

The vehicle communication control device 30-4 receives the response information transmitted by the communication control device 20, via the network NW, as indicated by reference sign g111. The vehicle communication control device 30-4 confirms, from the response information, whether or not the vehicle communication control device 30-4 is included in an area in which a communication relay instruction is performed. The vehicle communication control device 30-4 transmits the received response information, as indicated by reference sign g112.

A vehicle communication control device 30-5 mounted in the fifth vehicle 50-5 traveling in a transmission area in which inter-vehicle communication with the vehicle communication control device 30-4 is possible receives the response information transmitted by the vehicle communication control device 30-4, through the inter-vehicle communication. The vehicle communication control device 30-5 transmits the received response information through inter-vehicle communication.

The vehicle communication control unit 30-1 mounted in the first vehicle 50-1 traveling in a transmission area in which the inter-vehicle communication with the vehicle communication control unit 30-5 is possible receives the response information transmitted by the vehicle communication control unit 30-5, through the inter-vehicle communication.

Thus, in the embodiment, in a case in which the request information cannot be transmitted using the cellular line when the request information is transmitted to the communication control device 20, the vehicle communication control device 30 transmits the request information to the communication control device 20 to request the vehicle communication control device 30 mounted in another vehicle 50 to perform relay through the inter-vehicle communication. In the embodiment, when the request information is received, the communication control device 20 estimates the area in which the relay instruction is performed, and transmits the information only to the area. The vehicle communication control device 30 that has received the response information transmits the response information to the vehicle communication control device 30 mounted in the vehicle 50 that has transmitted the request information through inter-vehicle communication. A method of relaying the request information and a method of selecting the vehicle communication control device 30 that transmits the response information will be described below.

Thereby, according to the embodiment, even when the request information cannot be directly transmitted to the communication control device 20 using the cellular line, it is possible to transmit the request information to the communication control device 20 through the inter-vehicle communication with the vehicle communication control device 30 mounted in the other vehicle 50 and receive the response information from the communication control device 20. Although the vehicle 50-4 and the vehicle 50-5 are located between the vehicle 50-1 and the vehicle 50-3 as indicated by reference sign g12 in time t2 in the example illustrated in FIG. 1, the vehicle 50-2 may be, for example, the vehicle 50-5.

According to the embodiment, since a second vehicle that receives the information transmitted in the ad hoc mode transmits the information to the communication control device using the cellular line, it is possible to reduce the number of information relays, and thus, to perform reduction in an amount of communication traffic. According to the embodiment, since the response is transmitted to the vehicle 50 located (traveling or stopping) in the vicinity (including a transmission area) of the transmission area in which communication with the vehicle 50 that has transmitted the information is possible, it is possible to the number of times of relaying, and thus, to perform reduction in an amount of communication traffic. According to the embodiment, by transmitting the response received by the vehicle 50 to the other vehicle 50 in the ad hoc mode, it is possible for the other vehicle 50 to relay the response in the ad hoc mode and transmit the response to the vehicle 50 that has transmitted the request information. Thereby, according to the embodiment, it is possible to receive the response from the communication partner even when the mobile body is located in an area in which cellular communication is not possible.

[Configuration of Future Position Information]

Next, a configuration of the future position information extracted by the vehicle communication control device will be described. FIG. 2 is a diagram illustrating an example of a configuration of the future position information according to the embodiment. In FIG. 2, the example of the configuration of the future position information is represented in a table format. As illustrated in FIG. 2, the future position information includes a region identification code, a latitude, a longitude, an estimation scheme, and a certainty factor.

The region identification code is an identifier for uniquely identifying an area. The region identification code is used for specifying of vehicle position, specifying of an area to which the response information is transmitted, and a determination as to whether or not the vehicle receiving the response information receives the response information. The region identification code is, for example, a region mesh in which latitude and longitude are divided at equal intervals. However, the region identification code may be represented as a node on a map represented by nodes and links on roads. The latitude is a latitude of a representative point of the region identification code. The longitude is a longitude of the representative point of the region identification code.

An item of the estimation scheme indicates a logic when it is estimated that a vehicle will move to a position represented by the region identification code in the future. In the embodiment, three schemes including estimation based on destination setting information of a vehicle, estimation based on driving history information, and estimation based on the current position, the speed, and traveling direction of the vehicle are conceivable. Each estimation scheme will be described below.

An item of the certainty factor indicates a degree of a likelihood of a vehicle moving to a position in the future. The certainty factor may be a real number value between 0 and 1 or may be a discrete value such as high or low.

For future position information, a plurality of tables illustrated in FIG. 2 are linked to one piece of future position information. With such a format, a case in which a future position of the vehicle cannot be uniquely predicted, for example, can be represented.

[Configuration of Communication Control Device 20 and Vehicle Communication Control Device 30]

Figure 3:
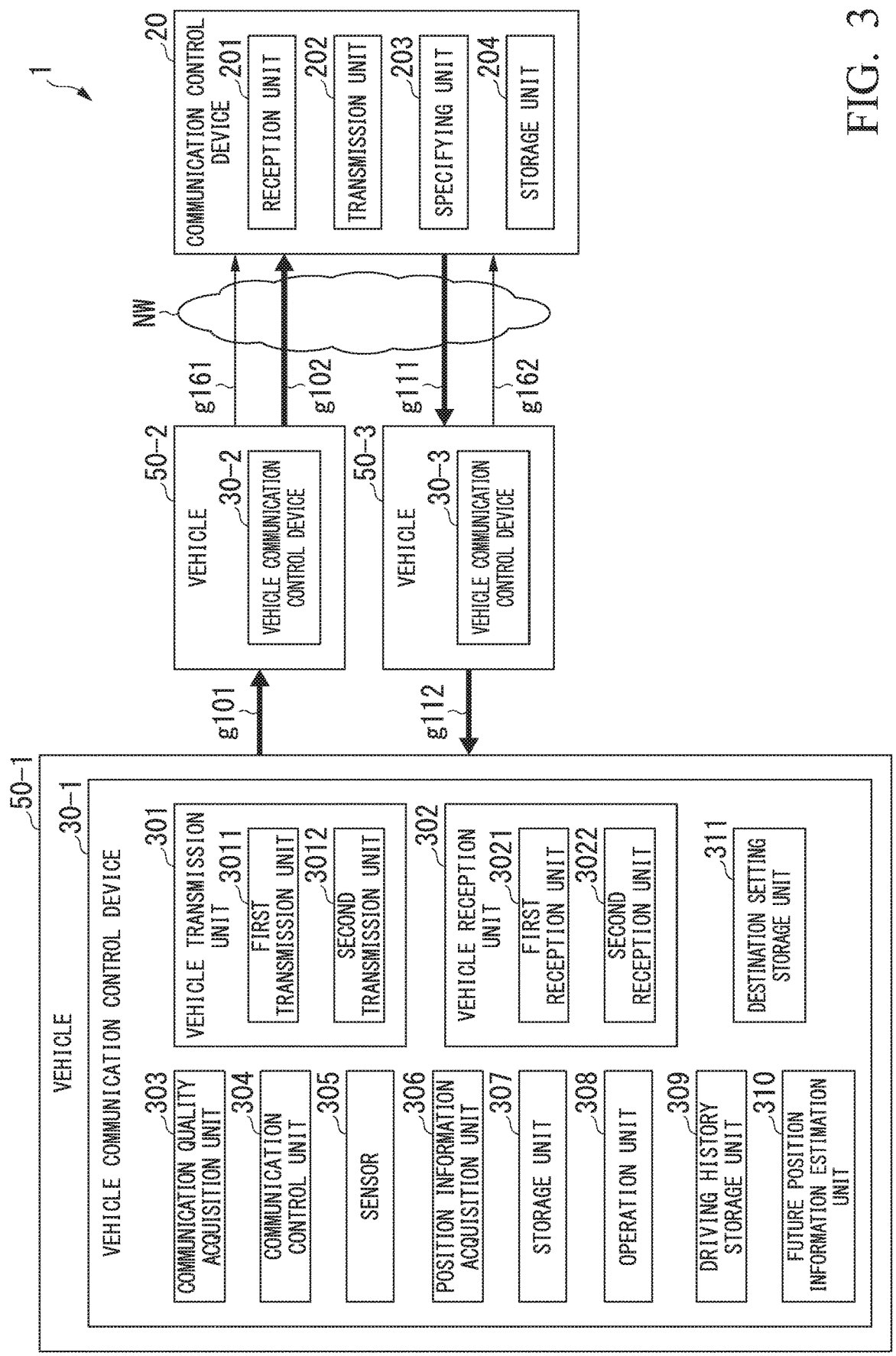
FIG. 3 is a block diagram illustrating an example of a configuration of a communication control device and a vehicle communication control device according to the embodiment.

Next, an example of a configuration of the communication control device 20 and the vehicle communication control device 30 will be described. FIG. 3 is a block diagram illustrating an example of a configuration of the communication control device 20 and the vehicle communication control device 30 according to the embodiment. In FIG. 3, vehicle communication control devices 30 (30-1, 30-2, and 30-3) mounted in the vehicles 50-1, 50-2, and 50-3, respectively, have the same configuration.

The vehicle communication control device 30 includes a vehicle transmission unit 301, a vehicle reception unit 302, a communication quality acquisition unit 303, a communication control unit 304, a sensor 305, a position information acquisition unit 306, a storage unit 307, and an operation unit 308, a driving history storage unit 309, a future position information estimation unit 310, and a destination setting storage unit 311. The vehicle transmission unit 301 includes a first transmission unit 3011 and a second transmission unit 3012. The vehicle reception unit 302 includes a first reception unit 3021 and a second reception unit 3022.

[Operation of Each Unit of Vehicle Communication Control Device 30]

The vehicle communication control device 30 generates request information on the basis of, for example, an instruction of a user, and performs control so that the generated request information is transmitted to the communication control device 20. The vehicle communication control device 30 performs control so that the response information transmitted by the communication control device 20 is received. The request information includes a request to the communication control device 20, position information of the vehicle 50 in which the vehicle communication control device 30 is mounted, and the future position information. The response information includes a response to the request information, information indicating the transmission destination, and the like.

The vehicle transmission unit 301 transmits the request information output by the communication control unit 304 to the communication control device 20 using the cellular line under the control of the communication control unit 304. Further, the vehicle transmission unit 301 transmits the request information or the response information output by the communication control unit 304 to the vehicle communication control device 30 mounted in the other vehicle 50 through inter-vehicle communication under the control of the communication control unit 304.

The first transmission unit 3011 is a transmission unit that transmits the request information using the cellular line. The first transmission unit 3011 transmits the request information output by the communication control unit 304 to the communication control device 20 using the cellular line under the control of the communication control unit 304. The first transmission unit 3011 transmits communication quality evaluation information output by the communication quality acquisition unit 303 to the communication control device 20 using the cellular line under the control of the communication control unit 304.

The second transmission unit 3012 is a transmission unit that transmits request information or response information through inter-vehicle communication. The second transmission unit 3012 transmits the request information or the response information output by the communication control unit 304 to the vehicle communication control device 30 mounted in the other vehicle 50 through the inter-vehicle communication under the control of the communication control unit 304.

The vehicle reception unit 302 receives the request information or the response information transmitted by the vehicle communication control device 30 mounted in the other vehicle 50 through the inter-vehicle communication. Further, the vehicle reception unit 302 receives the response information transmitted by the communication control device 20 using the cellular line.

The first reception unit 3021 is a reception unit that receives response information using the cellular line. The first reception unit 3021 receives the response information from the communication control device 20 using the cellular line under the control of the communication control unit 304. The first reception unit 3021 receives a response to the communication quality evaluation information from the communication control device 20 using the cellular line under the control of the communication control unit 304. The first reception unit 3021 receives the response information transmitted by the communication control device. In this case, the first reception unit 3021 compares region identification codes of the position information and the future position information included in the response information, position information extracted by the position information acquisition unit 306, and the future position information of the first reception unit 3021 extracted by the future position information estimation unit 310. The first reception unit 3021 obtains the response information when there is a region identification code included in both the response information and the information obtained from the vehicle communication control device 30, and otherwise discards the response information.

The second reception unit 3022 is a reception unit that receives the request information or the response information through inter-vehicle communication. The second reception unit 3022 receives the request information or the response information from the vehicle communication control device 30 mounted in the other vehicle 50 through inter-vehicle communication under the control of the communication control unit 304.

The communication quality acquisition unit 303 acquires information indicating the quality of transmission or reception signals of the first transmission unit 3011 and the first reception unit 3021 at each of predetermined times or at predetermined time intervals, for example. For example, the communication quality acquisition unit 303 outputs the communication quality evaluation information to the first transmission unit 3011, acquires a response output from the first reception unit 3021, and measures a time required for transmission and reception. The communication quality acquisition unit 303 discriminates that the communication quality according to the cellular line is poor or that communication is not possible, for example, when a response cannot be received within a predetermined time. The communication quality acquisition unit 303 outputs a communication quality discrimination result to the communication control unit 304. The communication quality acquisition unit 303, for example, may perform comparison with each of a plurality of predetermined times and classify the communication quality into a plurality of levels. For example, "the communication quality is the best" when the response is received within a first threshold value time, "the communication quality is good" when the response is received between the first threshold value time and a second threshold value time, "the communication quality is poor" when the response is received between the second threshold value time and a third threshold value time, and "communication is not possible" when the response is not received after the third threshold value time.

The communication control unit 304 extracts a request included in a detection result output by the operation unit 308. The request is, for example, a request to obtain a weather forecast of the current position or the destination, and a request to obtain information on restaurants at the destination. The communication control unit 304 measures a current time. The communication control unit 304 acquires the position information output by the position information acquisition unit 306, and acquires detection values (speed information and traveling direction information) output by the sensor 305. The communication control unit 304 reads identification information stored in the storage unit 307. The communication control unit 304 associates the identification information, the position information, and the future position information with the request to generate request information. The communication control unit 304 determines a transmission method on the basis of the communication quality discrimination result output by the communication quality acquisition unit 303 and outputs the generated request information to the first transmission unit 3011 or the second transmission unit 3012.

When the identification information included in the request information output by the second reception unit 3022 matches the identification information included in the request information received within a predetermined time, the communication control unit 304 does not output the received request information to the second transmission unit 3012. That is, the communication control unit 304 does not transmit the received request information to the vehicle communication control device 30 mounted in the other vehicle 50. A process when the identification information matches will be described below with reference to FIG. 5.

When the identification information included in the request information output by the second reception unit 3022 does not match the identification information included in the request information received within the predetermined time, the communication control unit 304 outputs the received request information to the second transmission unit 3012. That is, the communication control unit 304 transmits the received request information to the vehicle communication control device 30 mounted in the other vehicle 50.

When the identification information included in the response information output by the second reception unit 3022 matches the identification information included in the request information received within the predetermined time, or when the identification information included in the response information output by the second reception unit 3022 matches the identification information of the own device, the communication control unit 304 does not output the received response information to the second transmission unit 3012. That is, the communication control unit 304 does not transmit the received response information to the vehicle communication control device 30 mounted in the other vehicle 50.

When the identification information included in the response information output by the second reception unit 3022 does not match the identification information included in the response information received within the predetermined time, or when the identification information included in the response information output by the second reception unit 3022 does not match the identification information of the own device, the communication control unit 304 outputs the received response information to the second transmission unit 3012. That is, the communication control unit 304 transmits the received response information to the vehicle communication control device 30 mounted in the other vehicle 50. The communication control unit 304 stores the received response information in the storage unit 307. The communication control unit 304 may store information indicating a time when the request information is received, in association with the request information.

The sensor 305 is a sensor that detects a traveling speed of the vehicle 50, a sensor that detects a traveling direction (an acceleration) of the vehicle 50, and the like. The sensor outputs the detection values (the speed information and the traveling direction information) to the communication control unit 304.

The position information acquisition unit 306 is, for example, a GPS receiver. The position information acquisition unit 306 acquires position information indicating the current position on the basis of the received information. The position information acquisition unit 306 outputs the position information to the communication control unit 304. The position information acquisition unit 306 may acquire current time information indicating the current time on the basis of the received information. The position information acquisition unit 306 may output the current time information to the communication control unit 304.

The storage unit 307 stores identification information for identifying the own device. The storage unit 307 stores position information. The storage unit 307 stores the received request information. The storage unit 307 stores a program that the communication control unit 304 uses for control.

The operation unit 308 is, for example, a touch panel sensor or a mechanical switch. The operation unit 308 detects a result of an operation by the user and outputs the detected operation result to the communication control unit 304.

The driving history storage unit 309 stores information on a driving history of the vehicle 50, and stores a driving trajectory of the vehicle that has moved to a current point in time as a series of region identification codes.

The future position information estimation unit 310 estimates future position information on the basis of the information obtained from the position information acquisition unit, the driving history storage unit, and the destination setting storage unit. A specific process at the time of estimation will be described below.

The destination setting storage unit 311 stores information indicating the destination.

[Operation of Each Unit of Communication Control Device 20]

When the communication control device 20 receives the request information, the communication control device 20 specifies the area to which the response information is transmitted, on the basis of, for example, the position information and the future position information of the first vehicle included in the request information, and transmits the response information to each vehicle present in the specified area. The communication control device 20 transmits the response information to the request included in the request information to the vehicle communication control device 30 mounted in each vehicle in the specified area so that the response information is transmitted to the vehicle communication control device 30 that has transmitted the request information.

The reception unit 201 receives the request information transmitted by the vehicle communication control device 30 using the cellular line, and outputs the received request information to the specifying unit 203. The reception unit 201 receives the position information transmitted by each of the vehicle communication control devices 30 using the cellular line, and outputs the received position information to the specifying unit 203. The position information includes identification information of the vehicle communication control device 30 or the identification information of the vehicle 50.

The transmission unit 202 transmits the response information output by the specifying unit 203 to the vehicle communication control device 30 associated with the response information using the cellular line.

The specifying unit 203 extracts the request included in the received request information and acquires or generates a response to the extracted request. The specifying unit may limit a transmission area of the response information when an amount of communication traffic transmitted or received by the communication control device 20 is excessive.

The specifying unit 203 extracts the request included in the received request information and acquires or generates a response to the extracted request. The specifying unit 203 sets the region identification code of the future position information of the first vehicle included in the request information as a transmission destination of the response information. The specifying unit 203 may have a threshold value for setting the transmission destination and may remove a region identification code in which a certainty factor of the future position information is lower than the threshold value from the transmission destination of the response information. The specifying unit 203 may set the threshold value of the certainty factor for each future position estimation scheme. For example, when the future position estimation scheme is based on the destination setting, a region identification code in which the certainty factor is equal to or lower than a threshold value a1 is removed from the transmission destination of the response information, and when the estimation scheme is based on the driving history, a region identification code in which the certainty factor is equal to or lower than a threshold value a2 higher than the threshold value a1 is removed from the transmission destination.

The storage unit 204 stores the position information transmitted by each vehicle communication control device 30. The storage unit 204 stores, for example, map information represented by nodes and branches. The map information may be complemented on a cloud via the network NW. The storage unit 204 stores information indicating a transmission area in which communication of the vehicle 50 is possible. The storage unit 204 stores programs necessary for control of the reception unit 201, the transmission unit 202, and the specifying unit 203.

Components of the specifying unit 203 of the communication control device 20 or components of the vehicle communication control device 30 are realized by a hardware processor such as a central processing unit (CPU) executing a program (software). Some or all of the specifying unit 203 may be realized by hardware (a circuit part; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device including a non-transitory storage medium) such as a hard disk drive (HDD) or a flash memory in advance or may be stored in a removable storage medium (a non-transitory storage medium) such as a DVD or a CD-ROM and installed by the storage medium being mounted in a drive device.

[Estimation of Future Position Information]

Figure 4:
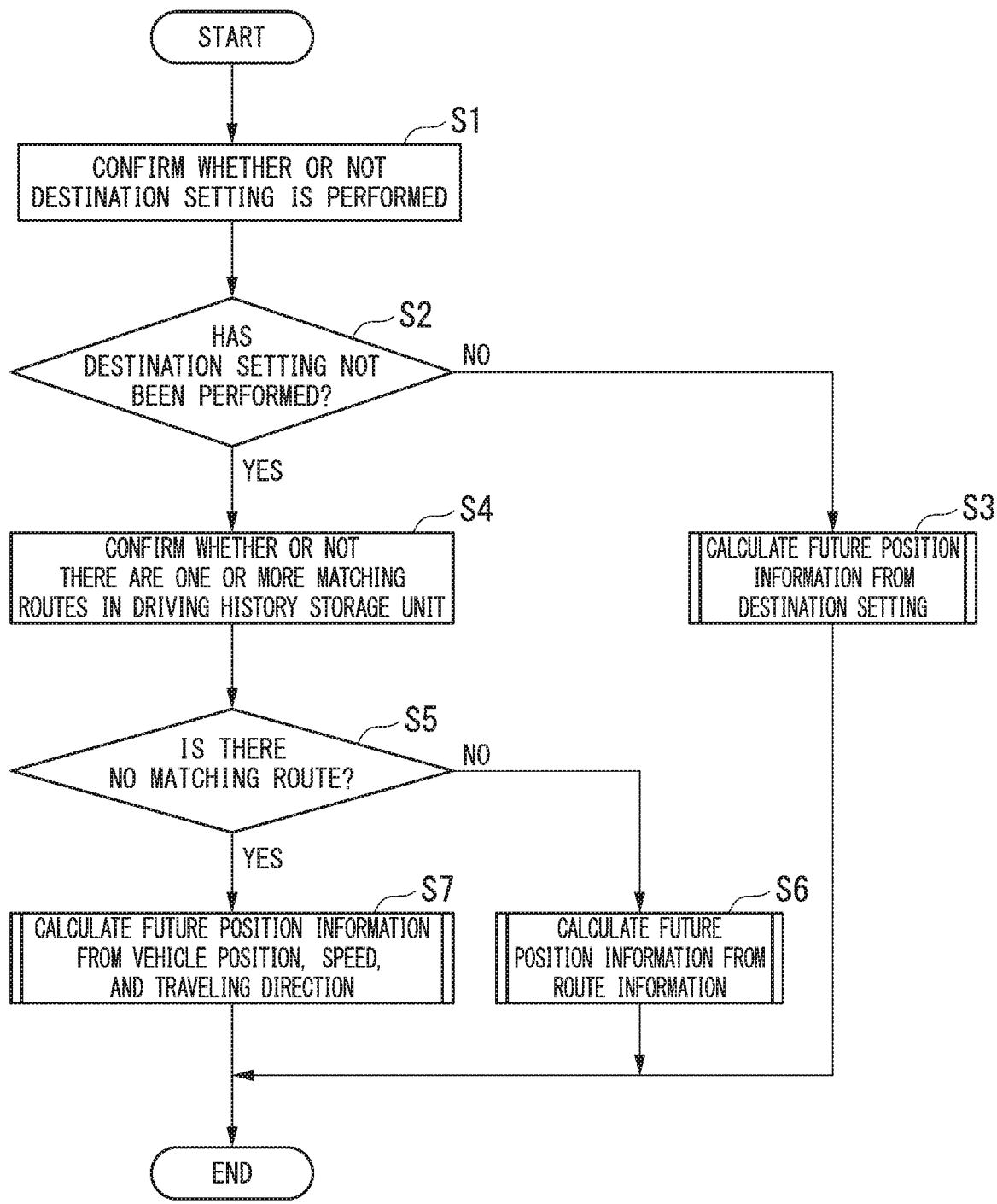
FIG. 4 is a flowchart of a process of estimating the future position information in the vehicle communication control device according to the embodiment.

Next, an example of a procedure for estimating the future position information will be described. FIG. 4 is a flowchart of a process of estimating the future position information in the vehicle communication control device 30 according to the embodiment.

The future position information estimation unit 310 extracts the destination setting information from the destination setting storage unit 311 and confirms whether or not a destination setting has currently been performed in the vehicle (step S1). Next, the future position information estimation unit 310 proceeds to a process of step S4 when the destination setting has been performed (step S2; YES), and to step S3 when the destination setting has not been performed (step S2; NO).

The future position information estimation unit 310 extracts a route setting from a current location to the destination. The future position information estimation unit 310 extracts all the region identification codes relevant to a route, and assigns a higher priority to a region identification code indicating an area closer to the current location to determine an order of the region identification codes. The future position information estimation unit 310 then acquires the vehicle speed from the sensor 305, and acquires a number of region identification codes proportional to the vehicle speed in an order of priority. The future position information estimation unit 310 extracts, as the future position information, the acquired region identification code to which various types of information shown in FIG. 2 have been added. When the vehicle speed is acquired, an average vehicle speed in a certain period of time may be acquired so that an influence of stopping at a signal is removed (step S3).

The future position information estimation unit 310 searches for the driving history of the vehicle recorded in the driving history storage unit 309, and confirms whether or not the current location of the vehicle is a place that the vehicle has passed previously. The future position information estimation unit 310 then searches the driving history storage unit 309 using the region identification code of the current location as a search query and extracts a matching driving trajectory. The future position information estimation unit 310 then compares the traveling direction information obtained from the sensor 305 with the trajectory and confirms that the traveling directions are the same. When there is the driving trajectory in which it is confirmed that the traveling directions are the same, a determination is made that there is a matching route. For the driving trajectory in the driving history storage unit 309 and a means for confirming whether or not current traveling directions of the vehicle are the same, the traveling direction of the vehicle may not be acquired from the sensor 305 and a determination may be made that the traveling directions are the same on the basis of the number of region identification codes that continuously match the latest history (a current driving trajectory) of the driving history storage unit 309 (step S4).

The future position information estimation unit 310 determines whether or not there is no matching route in step S4 (step S5). The future position information estimation unit 310 proceeds to a process of step S7 when there is no matching route (step S5; YES), and to a process of step S6 when there is a matching route (step S5; NO).

In step S4, the future position information estimation unit 310 acquires a region identification code that is the same as a region identification code indicating a current vehicle position among region identification codes of trajectories in which traveling directions have been confirmed to be the same, and adopts an identification code subsequent to the identification code as the region identification code of the future position information. The future position information estimation unit 310 adjusts the number of region identification codes subsequent to a region identification code indicating the current location on the driving trajectory to be adopted as the future position information, according to the speed of the vehicle. A higher certainty factor is assigned to a region identification code closer to the current location. When a plurality of matching driving trajectories are obtained in step S4, the region identification codes may be adopted from each trajectory. Further, a high certainty factor may be assigned to a region identification code appearing in common in a plurality of driving trajectories (step S6).

The future position information estimation unit 310 predicts a future movement destination from the current vehicle position, the speed, and the traveling direction to estimate the future position information. In the embodiment, a region identification code included within a certain distance from coordinates shifted by a size proportional to the speed in the traveling direction from the current vehicle position, and representative coordinates associated with the region identification code are extracted as the future position information (step S7).

The future position information estimation unit 310 ends the procedure for estimating the future position information after the processes of steps S3, S6, and S7 end.

[Transmission Information Transmitted by Vehicle Communication Control Device 30]

Next, an example of transmission information transmitted by the vehicle communication control device 30 will be described. FIG. 5 is a diagram illustrating an example of the transmission information transmitted by the vehicle communication control device 30 according to the embodiment.

As illustrated in FIG. 5, the transmission information transmitted by the vehicle communication control device 30 mounted in the first vehicle 50 is request information. The request information includes information indicating a request, identification information of the vehicle communication control device 30 mounted in the first vehicle 50 (or identification information of the first vehicle 50), position information of the first vehicle 50, current time information at a point in time at which the request information has been transmitted, and future position information of the first vehicle 50.

Information received by the vehicle communication control device 30 mounted in the second vehicle 50 is the request information transmitted by the first vehicle 50. The vehicle communication control device 30 mounted in the second vehicle 50 transmits transmission information in which identification information of the vehicle communication control device 30 mounted in the second vehicle 50 (or identification information of the second vehicle 50) and future position information of the second vehicle are associated with the request information.

Information received by the vehicle communication control device 30 mounted in the third vehicle 50 is transmission information in which identification information of the vehicle communication control device 30 mounted in the second vehicle 50 (or identification information of the second vehicle 50) is associated with the request information. The vehicle communication control device 30 mounted in the third vehicle 50 transmits transmission information in which identification information of the vehicle communication control device 30 mounted in the third vehicle 50 (or identification information of the third vehicle 50) and future position information of the third vehicle are also associated with the received information.

Thus, in the embodiment, the vehicle communication control device 30 that performs relay further associates the identification information of the own device (or the identification information of the vehicle 50) with the received information and transmits the resultant information.

[Transmission of Request Information and Reception of Response Information]

Next, an example of a processing procedure for transmitting request information and receiving response information will be described. FIG. 6 is a flowchart of an example of a process of transmitting request information and receiving response information according to the embodiment. In FIG. 6, it is assumed that that a first vehicle communication control device 30-1 is mounted in the first vehicle 50-1, a second vehicle communication control device 30-2 is mounted in the second vehicle 50-2, and a third vehicle communication control device 30-3 is mounted in the third vehicle 50-3. For simplification of description, there is one vehicle communication control device 30 that performs relaying at the time of transmission of the request information, and there are two vehicle communication control devices 30 that perform relaying at the time of transmission of the response information. There may be two or more vehicle communication control devices 30 that perform relaying. In the example illustrated in FIG. 6, the first vehicle communication control device 30-1 mounted in the first vehicle 50-1 is traveling in an area in which communication using the cellular line is not possible in a tunnel or the like.

The position information acquisition unit 306 of the first vehicle communication control device 30-1 acquires the position information, for example, at predetermined time intervals, updates the acquired position information, and stores the position information in the storage unit 307 (step S11). The position information acquisition unit 306 can acquire the position information in, for example, a transmission area in which communication with a GPS system is possible, and position information acquired before entrance to the tunnel is the latest position information.

The communication quality acquisition unit 303 of the first vehicle communication control device 30-1 acquires information indicating the communication quality of the first transmission unit 3011 and the first reception unit 3021 at the time of transmission of the request information. Subsequently, the communication control unit 304 of the first vehicle communication control device 30-1 confirms whether or not communication using the cellular line is possible on the basis of the information indicating the communication quality (step S12). An example illustrated in FIG. 4 is an example in which it is confirmed that communication using the cellular line is not possible. When it is confirmed that communication using the cellular line is possible on the basis of the communication quality, the communication control unit 304 of the first vehicle communication control device 30-1 controls the second transmission unit 3012 so that the request information is transmitted to the communication control device 20 using the cellular line.

When it is not confirmed that communication using the cellular line is possible on the basis of the communication quality, that is, when communication is not possible using the cellular line, the communication control unit 304 of the first vehicle communication control device 30-1 transmits the request information through inter-vehicle communication (step S13). The second vehicle communication control device 30-2 mounted in the second vehicle 50-2 traveling in an area in which inter-vehicle communication with the first vehicle communication control device 30-1 is possible then controls the second reception unit 3022 so that the request information is received through inter-vehicle communication (step S14).

The communication quality acquisition unit 303 of the second vehicle communication control device 30-2 acquires the information indicating the communication quality of the first transmission unit 3011 and the first reception unit 3021 when the request information is relayed and transmitted. Subsequently, the communication control unit 304 of the second vehicle communication control device 30-2 confirms whether or not communication using the cellular line is possible on the basis of the information indicating the communication quality (step S15). The example illustrated in FIG. 4 is a case in which it is confirmed that communication using the cellular line is possible. When it is confirmed that communication is not possible using the cellular line on the basis of the communication quality, the communication control unit 304 of the second vehicle communication control device 30-2 controls the second transmission unit 3012 so that the request information is transmitted to the vehicle communication control device 30 mounted in the other vehicle 50 through inter-vehicle communication.

The reception unit 201 of the communication control device 20 acquires the position information of each of the vehicles 50 (including the second vehicle 50-2 and the third vehicle 50-3), and stores the acquired position information in the storage unit 204 (step S16).

When it is confirmed that communication using the cellular line is possible on the basis of the communication quality, the communication control unit 304 of the second vehicle communication control device 30-2 transmits transmission information in which identification information of the second vehicle communication control device 30-2 mounted in the own vehicle 50-2 (or the identification information of the second vehicle 50-2) is associated with the request information, using the cellular line (step S17). The reception unit 201 of the communication control device 20 then receives the request information using the cellular line (step S18).

The specifying unit 203 specifies an area to which the request signal is transmitted, on the basis of the position information, the future position information, and the current time information included in the received request information (step S19).

The specifying unit 203 extracts the request included in the received request information and acquires or generates a response to the extracted request. Subsequently, the specifying unit 203 transmits transmission information in which a region identification code of the transmission destination is associated with the response information to the third vehicle 50-3 via the transmission unit 202 using the cellular line (step S20). Subsequently, the third vehicle communication control device 30-3 mounted in the third vehicle 50-3 controls the first reception unit 3021 such that the response information is received using the cellular line (step S21).

The communication control unit 304 of the third vehicle communication control device 30-3 compares identification information indicating a response destination associated with the received response information with the identification information of the own device. Subsequently, when the communication control unit 304 of the third vehicle communication control device 30-3 can confirm that the identification information indicating the response destination does not match the identification information of the own device (step S22), the communication control unit 304 of the third vehicle communication control device 30-3 performs confirming as to whether the maximum number of times of relaying has been exceeded (step S23). The communication control unit 304 transmits the response information to the other vehicle 50 through the inter-vehicle communication (step S24).

The second vehicle communication control device 30-2 mounted in the second vehicle 50-2 traveling in an area in which inter-vehicle communication with the third vehicle communication control device 30-3 is possible controls the second reception unit 3022 such that the response information is received through inter-vehicle communication (step S25).

The communication control unit 304 of the second vehicle communication control device 30-2 compares the identification information indicating the response destination associated with the received response information with the identification information of the own device. Subsequently, the communication control unit 304 of the second vehicle communication control device 30-2 confirms that the identification information indicating the response destination and the identification information of the own device do not match (step S26). The communication control unit 304 performs confirming as to whether or not the maximum number of times of relaying has been exceeded (step S27). The response information is transmitted to the other vehicle 50 through inter-vehicle communication (step S28).

The first vehicle communication control device 30-1 mounted in the first vehicle 50-1 traveling in an area in which the inter-vehicle communication with the second vehicle communication control device 30-2 is possible controls the second reception unit 3022 such that the response information is received through inter-vehicle communication. Subsequently, the communication control unit 304 of the first vehicle communication control device 30-1 compares the identification information indicating the response destination associated with the received response information with the identification information of the own device. Since the communication control unit 304 of the first vehicle communication control device 30-1 can confirm that the identification information indicating the response destination and the identification information of the own device match, the communication control unit 304 discriminates that the response information has been transmitted to the own device (step S29).

In FIG. 4, when the first vehicle 50-1 is traveling in an area in which direct inter-vehicle communication with the vehicle communication control device 30-3 is possible, the vehicle communication control device 30-3 transmits the response information to the first vehicle communication control device 30-1 through inter-vehicle communication.

As described above, in the embodiment, it is possible to reduce the number of times of relaying at the time of transmission and reception of the response information. In the embodiment, it is possible to reduce an amount of communication traffic by limiting vehicles relaying the response information.

[Relay Method Between Vehicle Communication Control Devices 30]

Figure 7:
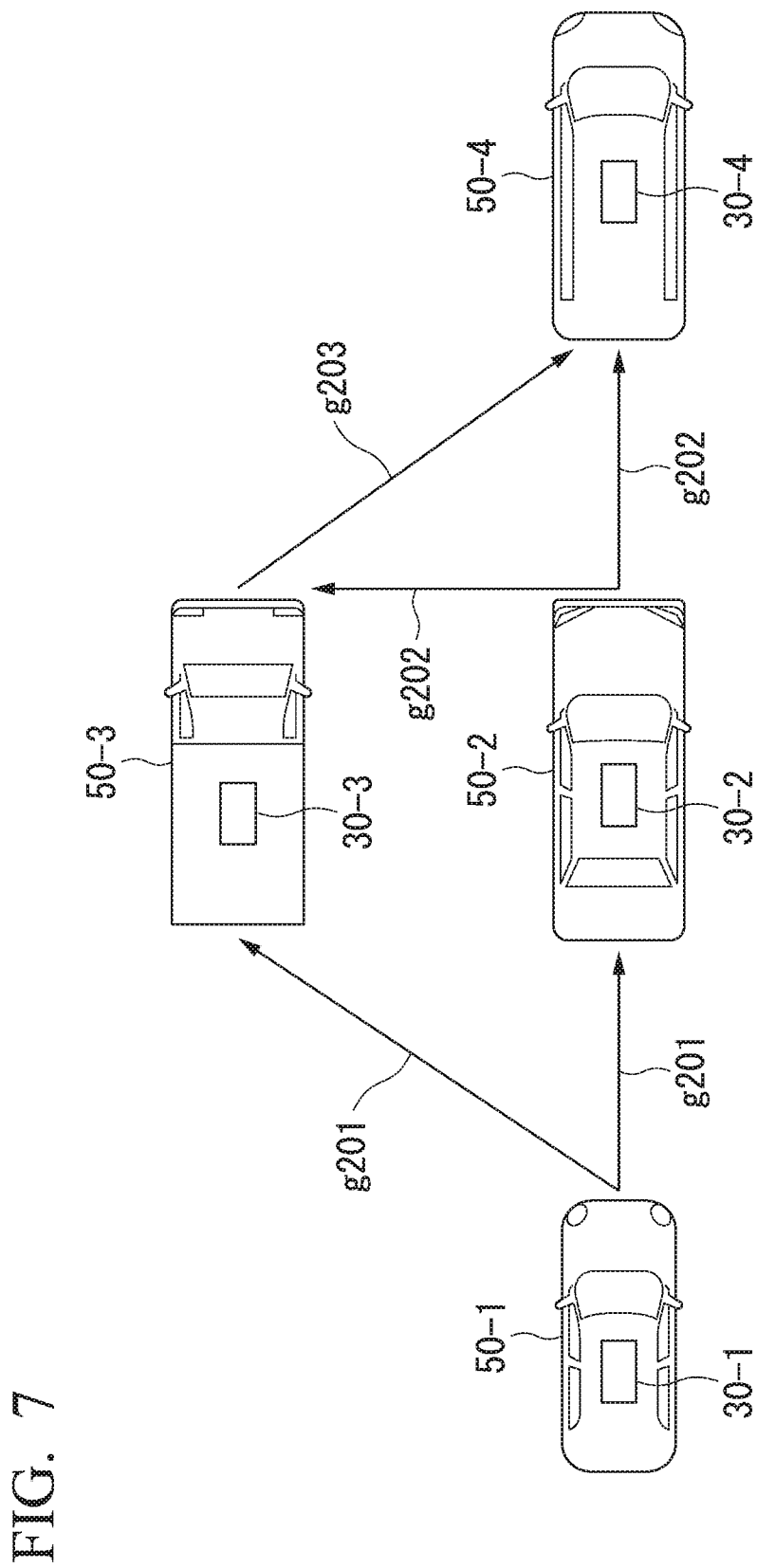
FIG. 7 is a diagram illustrating a relay method between vehicle communication control devices according to the embodiment.

Next, a relay method between the vehicle communication control devices 30 will be described. FIG. 7 is a diagram illustrating a relay method between the vehicle communication control devices 30 according to the embodiment. In the following description, an n-th vehicle communication control device 30 mounted in an n-th (n is any integer between 1 and 4) vehicle 50-$n$ is also simply referred to as an n-th vehicle 50-$n$.

The first vehicle 50-1 transmits request information through inter-vehicle communication.

Each of the second vehicle 50-2 and the third vehicle 50-3 that are traveling in an area in which inter-vehicle communication with the first vehicle 50-1 is possible receives the request information (reference sign g201).

As a result, the second vehicle 50-2 transmits transmission information in which the identification information of the own device has been added to the received request information through the inter-vehicle communication (reference sign g202). Further, the third vehicle 50-3 transmits transmission information in which the identification information of the own device has been added to the received request information through the inter-vehicle communication (reference sign g203).

The third vehicle 50-3 also acquire the request information from the second vehicle 50-2 as indicated by reference sign g202. In such a case, the communication control unit 304 of the third vehicle communication control device 30-3 mounted in the third vehicle 50-3 extracts the identification information of the first vehicle communication control device 30-1 mounted in the first vehicle 50-1 included in the received request information. In the example of FIG. 5, the communication control unit 304 of the third vehicle communication control device 30-3 acquires the request information from the first vehicle 50-1 in time t101, and acquires the request information from the second vehicle 50-2 in time t102 after time t101. The communication control unit 304 of the third vehicle communication control device 30-3 determines that request information including the identification information of the first vehicle communication control device 30-1 mounted in the first vehicle 50-1 has already been relayed by the second vehicle 50-2, and discards all pieces of received request information without performing a relaying process. Thereby, the communication control unit 304 of the third vehicle communication control device 30-3 can prevent the request information from being transmitted, can effectively utilize communication resources, and can reduce power consumption of the third vehicle communication control device 30-3.

The vehicle 50-2 may wait for a certain period of time after receiving the request information in time t101 and confirm that the same request information is not received during a waiting period of time. In this case, although a time required to relay the request information increases, it is possible to confirm that the same request information is received during the waiting period of time and cancel relaying to reduce the number of times of relaying.

The vehicle 50-2 calculates the number of times of relaying from the request information, and discards the request information without performing relaying of the request information when the number of times of relaying is equal to or greater than a preset number of times. This set number of times generally called the number of hops. By performing such a process, it is possible to prevent the request signal from continuously staying on an ad hoc network.

Although the example in which the request information is transmitted and received has been described with reference to FIG. 5, the communication control unit 304 of the vehicle communication control device 30 also performs the same process when the response information is transmitted and received.

Modes for carrying out the present invention have been described above using the embodiments, but the present invention is not limited to these embodiments at all, and various modifications and substitutions are made without departing from the gist of the present invention.

What is claimed is:

1. A communication control device comprising:

a reception unit configured to receive information transmitted from a first vehicle to a second vehicle in an ad hoc mode, which is an inter-vehicle communication, wherein the information is transmitted from the second vehicle through a cellular line;

a specifying unit configured to specify a transmission area in which communication with the first vehicle in the ad hoc mode is possible based on current position information and future position information of the first vehicle included in the information; and a transmission unit configured to transmit, to a third vehicle located in a vicinity of the transmission area through the cellular line, a response to the information including an instruction to perform ad hoc communication with the first vehicle.

2. The communication control device according to claim 1, wherein the specifying unit transmits, to the third vehicle, the response including an instruction to perform ad hoc communication with a fourth vehicle located in the transmission area when the third vehicle is not located in the transmission area.

3. The communication control device according to claim 1, wherein the information further includes a request to the communication control device, a current time, and identification information for identifying the first vehicle.

4. A communication control method comprising:
   receiving, by a computer, information transmitted from a first vehicle to a second vehicle in an ad hoc mode, which is an inter-vehicle communication, through a cellular line;
   specifying, by the computer, a transmission area in which communication with the first vehicle in the ad hoc mode is possible based on current position information and future position information of the first vehicle included in the information; and
   transmitting, by the computer to a third vehicle located in a vicinity of the transmission area through the cellular line, a response to the information including an instruction to perform ad hoc communication with the first vehicle.

5. A computer-readable non-transitory storage medium storing a program, the program causing a computer to:
   receive information transmitted from a first vehicle to a second vehicle in an ad hoc mode, which is an inter-vehicle communication, through a cellular line;
   specify a transmission area in which communication with the first vehicle in the ad hoc mode is possible based on current position information and future position information of the first vehicle included in the information; and
   transmit, to a third vehicle located in a vicinity of the transmission area through the cellular line, a response to the information including an instruction to perform ad hoc communication with the first vehicle.

6. The communication control device according to claim 1, wherein
   the reception unit acquires the future position information estimated in the first vehicle,
   the future position information includes one or more region identification codes for uniquely identify an area, and
   a certainty factor representing a certainty of being expected to move to the area in a future time is associated with each of the region identification codes.

* * * * *